SOUND SYNCHRONIZING SYSTEM

Filed Aug. 5, 1968 2 Sheets-Sheet 1

INVENTOR.
LOREN L. RYDER,
By Charlton M. Lewis

INVENTOR.
LOREN L. RYDER,
By Charlton M. Lewis

United States Patent Office 3,563,641
Patented Feb. 16, 1971

3,563,641

SOUND SYNCHRONIZING SYSTEM

Loren L. Ryder, Sherman Oaks, Calif.
(1147 N. Vine St., Hollywood, Calif. 90038)

Filed Aug. 5, 1968, Ser. No. 750,348
Int. Cl. G03b *31/00*
U.S. Cl. 352—17 18 Claims

ABSTRACT OF THE DISCLOSURE

Motion picture film and magnetic sound tape are synchronized by providing on the tape synchronizing signals of a form that can be sensed with the tape stationary and by sensing such signals in multiphase. The camera or projector is driven by multiphase current derived from the respective signal components, usings a step-synchronous motor. The tape can then be driven without compromising the sound quality, and the film maintains sync during stop, start and reversal of the tape. The sync signal of stationary readable form may comprise a punched hole or other visible mark for each picture frame. Such marks are readable by photosensors and facilitate hand synchronization, especially during editing. The stationary readable signal may be pre-recorded on the tape and employed to drive the camera during recording and to drive the projector during reproduction. Or, if a camera-generated sync signal is magnetically recorded on the tape along with the sound, that signal can be later sensed magnetically and a stationary readable signal applied to the tape under its control. Such conversion permits many tapes recorded by previous processes to be reproduced by the present method.

This invention has to do with the drive of information carrying strips such as sound tapes and motion picture films, for example, and with means for maintaining synchronization in the drive of two such strips carrying related information.

More particularly, the invention provides means for driving two such strips during utilization of the recorded information in the same mutual time relation in which the information was recorded, regardless of starting and stopping of the strips either during recording or during utilization of the information.

Whereas the invention is useful in other related fields, it is particularly effective in connection with sound motion pictures. For the sake of clarity, the invention will therefore be described primarily as it relates to the synchronization of a motion picture film and a magnetic tape record of the accompanying sound.

Many systems have been proposed for synchronizing motion picture films and magnetic sound tapes. Such systems may use perforated sound tapes or may provide on the sound tapes special synchronizing signals, usually recorded magnetically in a manner that does not interfere with the sound record. However, all such previous systems require that at the start of each recording sequence a special start signal or index of synchronization be applied to both the picture film and the sound record, typically by the well-known clap-stick. Further, each of the previous systems requires transferring of the sound signal from the tape to sprocketed driven magnetic film, thence synchronizing the picture and sound start marks for each scene, and subsequently splicing the scenes together prior to projection and editing.

The present invention, on the other hand, permits the camera and recorder to be stopped at will between successive "takes" without a special indexing procedure; and then permits the sound record to be driven for reproduction or editing under its normal speed control while the motion picture film is driven in precise relative synchronization. The film and tape movements during reproduction can be stopped and started at will, and even reversed, and will still maintain exact synchronization.

This improved type of synchronization is accomplished, in accordance with the invention, by providing on the sound record a periodic timing signal of a type that can be sensed at stop as well as during film movement. The signal is read from the tape in multiphase and translated, typically by direct current amplification, into current components having mutual phase relations that correspond to the longitudinal position of the tape. The motion picture film is driven by an electric motor in response to the multiphase current, the motor having a rotor that is continuously driven to maintain the rotor angle in correspondence with the mutual phase relations of the current components. Such a motor will be referred to as a "step-synchronous" motor, since it acts as a step motor during start and slow rotation and operates as a synchronous motor when driving at normal speed.

In a preferred form of the invention, the timing signals on the sound record are initially recorded in magnetic form in response to a signal generator that is driven with the motion picture camera. After completion of the initial sound record, those magnetic signals are sensed by a transducer under conventional conditions of relative movement, and corresponding signals are applied to the record in a form that can be read independently of the tape movement. Signals of the latter type will be referred to for convenience as "stationary readable." Such signals may, for example, comprise optically visible signals that can be sensed by photosensitive devices. For reproduction, the treated sound tape is driven in the normal manner, and the timing signals are read in multiphase, typically by two, three or more similar sensors longitudinally spaced with respect to the film to produce multiphase current components. The sensor outputs may be independently direct-current amplified. The resulting currents are typically applied to a permanent maget multiphase motor coupled directly to the motion picture projector.

At the start of projection, the first frame of the picture is threaded in the projection aperture, and the sound tape is placed in the reproducer at any convenient position ahead of the first visible timing signal. When the sound reproducer is started, the projector will start at the point of camera start, then run and stop in frame by frame synchronization with the sound. If the tape reproducer is reversed, the projector will reverse in sync. Since the projector runs only in response to sync signals on the tape, and since those signals resulted from camera operation during recording of the information, the projector will stop during any section of the tape during which the camera was not running, and will start again in synchronization with the start of the camera. In this use of the invention, for each scene, the number of frame indicias on the sound tape always corresponds directly to, and typically equals, the number of used frames in the camera. No clap-stick or other start index is required to mark the start of each sequence.

An alternative form of the invention utilizes a sound record medium having prerecorded on it a periodic timing signal that is readable independently of record movement. During recording of the sound, a multiphase current is derived from the timing signal and is employed to drive the camera through a step-synchronous motor of the type already described for driving a projector. Utilization of the recorded information may be carried out as already described. This embodiment avoids the step of converting the initially recorded timing signal to a stationary readable type, but requires modification of the camera drive, as compared to conventional cameras.

In accordance with a further aspect of the invention, motor picture film and sound tape that have been produced initially by any of the previously proposed techniques, typically employing a sync signal generated in the motion picture camera and recorded magnetically on the tape, can be adapted for projection in accordance with the present invention. Such projection by the present method requires only that the conventional magnetically recorded sync signal on the sound tape be converted to a suitable type that is readable independently of tape movement. The motion picture projector is then driven under control of the multiphase currents developed from that stationary readable sync signal in the manner already described.

It is preferred that the periodic, stationary readable sync signal be conveniently visible and that its period correspond approximately to the frame spacing or sprocket spacing of the motion picture film. During editing of the film the operator can then see immediately the correspondence between a section of film and its accompanying sound record.

A preferred type of sync signal comprises holes punched in the sound tape at a period corresponding to the sprocket holes of the film. Such holes can be read in any suitable manner, as by light sensing devices or by fingers that project through the holes to close electrical circuits. Moreover, such holes may be used as sprocket holes to facilitate handling the tape in step with the film during editing and similar processes. However, satisfactory stationary readable signals may be formed in many different ways, such as applying a coating material to the tape, scraping through the magnetic coating of the tape or deformation of the tape.

A particular advantage of the invention is that, during both recording and reproducing the sound, the sound record can be driven by a conventional tape drive designed primarily to give constant speed. The constancy and accuracy of the tape speed are not compromised by the synchronizing mechanism.

A full understanding of the invention, and of its further objects and advantages, will be had from the following description of certain illustrative manners of carrying it out. The particulars of that description, and of the accompanying drawings which form a part of it, are intended only as illustration and not as a limitation upon the scope of the invention.

Figures 1, 3:
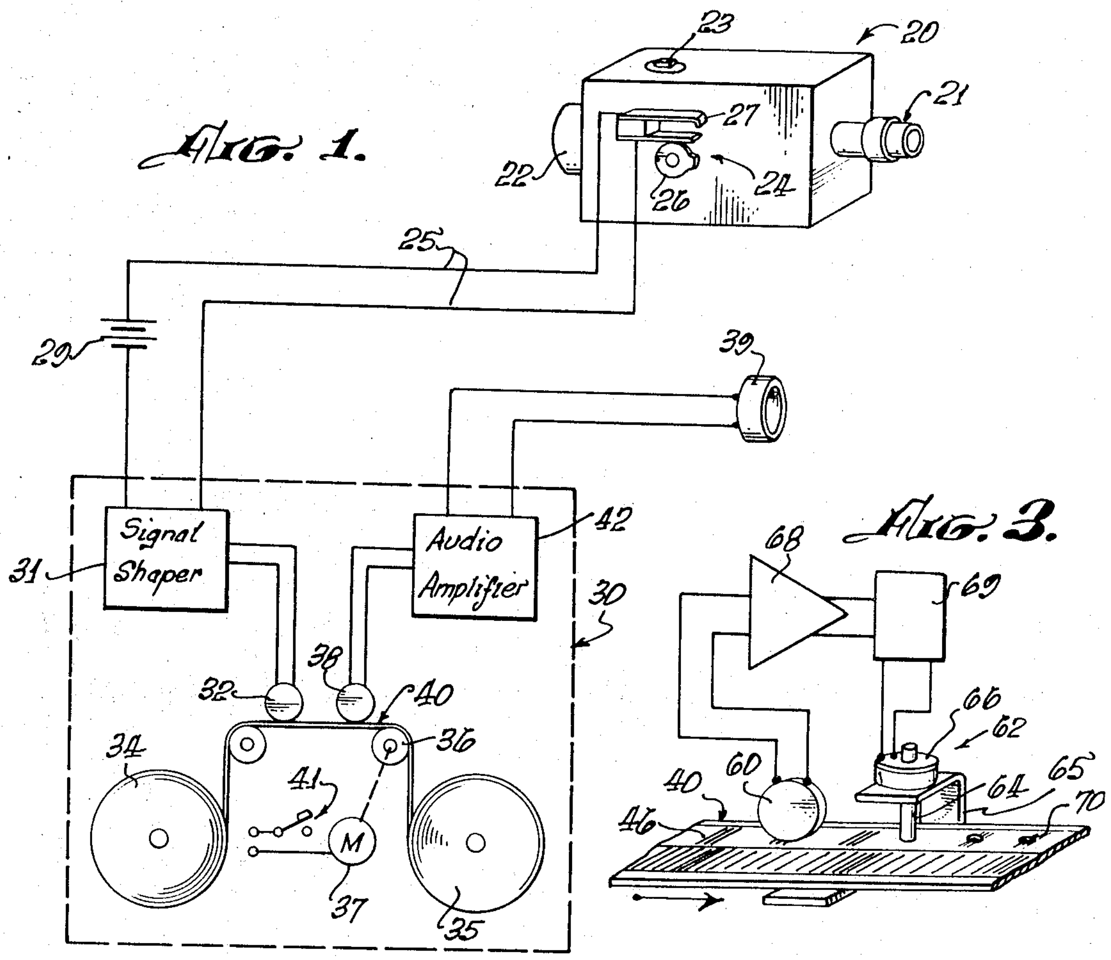
FIG. 1 is a schematic drawing representing an illustrative mechanism for recording action and accompanying sound.
FIG. 3 is a schematic drawing representing apparatus for converting the synchronizing signal of FIG. 2 to a stationary readable form.
Figure 4:
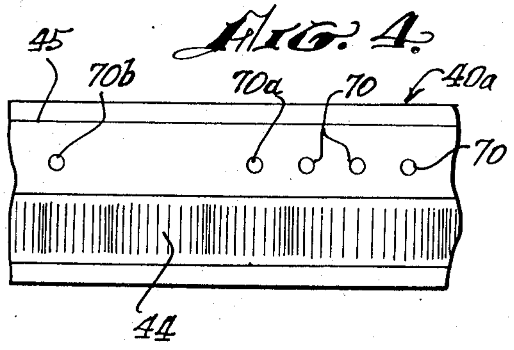
FIG. 4 is a drawing corresponding to FIG. 2 and representing a sound record after such conversion.
Figures 5, 6, 7, 8:
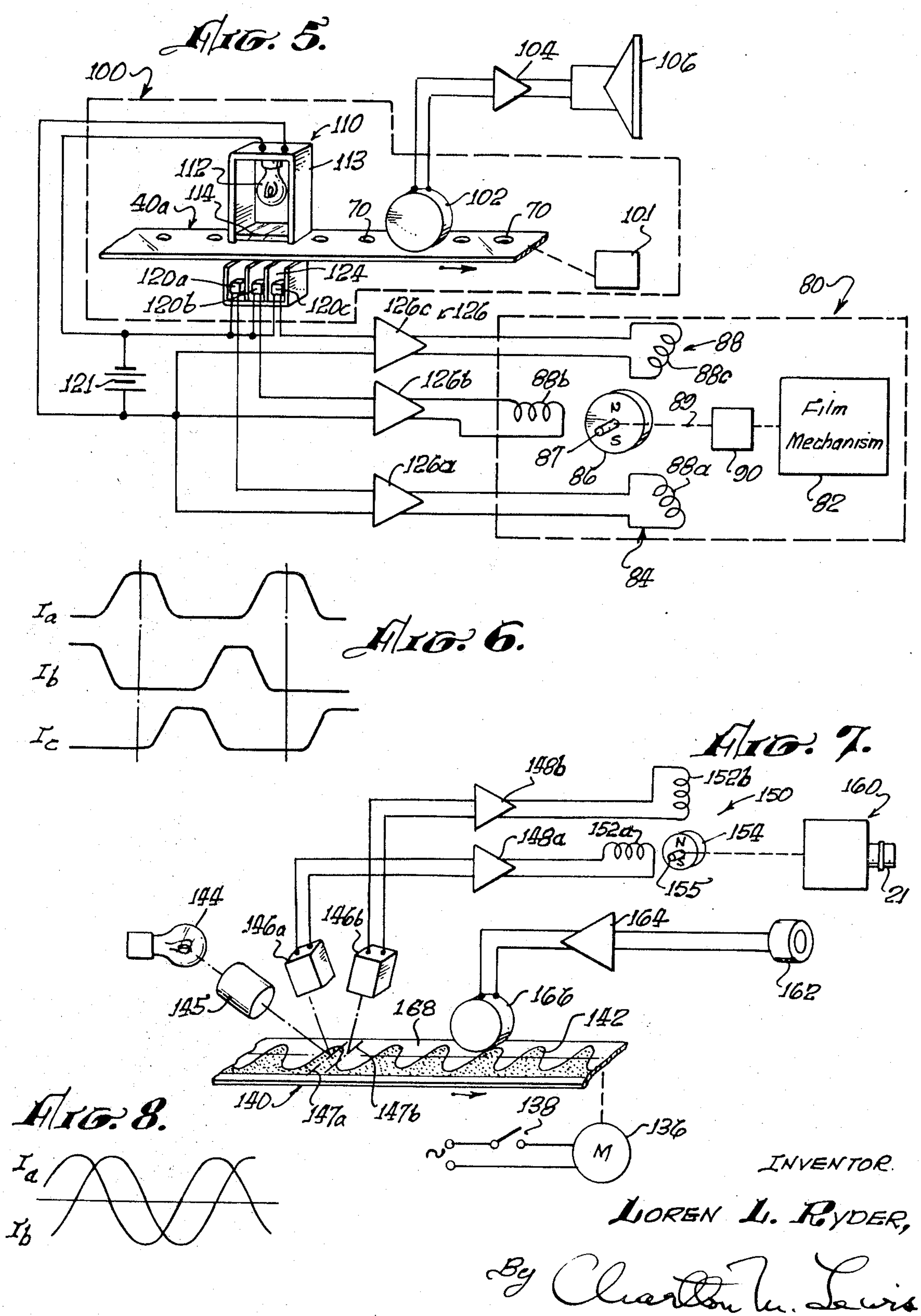
FIG. 5 is a schematic drawing representing an illustrative mechanism for reproducing recorded action and sound in accordance with the present invention.
FIG. 6 is a diagram illustrating typical multiphase current components.
FIG. 7 is a schematic drawing representing a further illustrative mechanism for recording action and accompanying sound.
FIG. 8 is a diagram illustrating typical two-phase current components.

A preferred manner of carrying out the invention is illustrated schematically in FIGS. 1 to 6, FIG. 1 representing particularly the recording of information and FIG. 5 its reproduction. In FIG. 1 a motion picture camera is designated generally at 20 with an objective lens 21 and with a conventional drive motor 22 which can be turned on and off at will, as by the control switch indicated at 23. Camera 20 is equipped with a signal generating device, indicated generally at 24, which generates a series of periodic electrical signals on the lines 25 during camera operation. Those signals may be of any repetitive type, typically comprising sharp voltage pulses or pips. As illustrated, a rotary cam 26 is driven with the camera intermittent movement and closes the switch 27 in definite timed relation to the film advancing mechanism of the camera. The switch 27 is typically closed for a brief period once for each film frame exposed by the camera, causing a signal current from the battery 29 to flow in lines 25.

The signal developed by closure of switch 27 is shaped and/or limited by suitable circuitry indicated at 31 and is supplied in suitable form to the magnetic signal recording head 32 of the tape recorder 30. Tape recorder 30 typically comprises a conventional tape deck with supply and takeup reels 34 and 35 and mechanism 36 for advancing the magnetic tape 40. Mechanism 36 is driven by the electric motor 37 under control of a switch 41. A conventional magnetic sound recording head is indicated at 38, receiving its audio signal from the microphone 39 and the audio amplifier 42. Tape recorder 30 may be entirely conventional except for addition of sync signal recording head 32.

Figure 2:
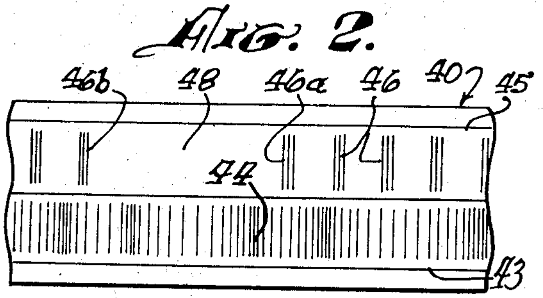
FIG. 2 is a schematic drawing representing a magnetic sound record carrying a synchronizing signal.

The two recording heads 32 and 38 may be arranged in any suitable manner which permits reproduction of the sound record and the signal record without mutual crosstalk. In this simple form of this invention, this is accomplished by lateral offset of the two recording heads, so that the sound is recorded in an audio band 43 adjacent one edge of the tape and the sync signals are recorded in a sync band 45 adjacent the other edge of the tape, as shown in FIG. 2. The recorded sound is indicated schematically at 44 and the sync signals at 46 in FIG. 2, although the magnetic recording is actually invisible.

In operation of the information recording system of FIG. 1, tape recorder 30 is first started at switch 41, coming rapidly to normal speed. Camera 20 is then operated in the normal manner, being turned on and off at switch 23 to photograph desired sequences of the action to be recorded. Between such takes recorder 30 may be turned off if desired, but is started again in advance of camera 20. Since sync signals are generated by cam switch 27 only during camera operation, signal track 45 is blank during those sections of magnetic tape 40 which are run past head 32 while the camera is idle. In FIG. 2, such a blank section is indicated at 48 with the last sync signal of the preceding take indicated at *46a* and the first sync signal of the succeeding take at *46b*. The sound record 44 corresponding to blank section 48 of the sync record may also be blank or may contain sound which is not directly associated with any photographed action.

The recording technique so far described is similar in many respects to previously known recording methods. In accordance with a primary aspect of the present invention, sync signals 46, magnetically recorded on tape 40, are replaced by corresponding sync signals which have the property of being automatically readable independently of tape movement. An illustrative mechanism for producing that change is illustrated in FIG. 3. That mechanism comprises conventional means, not explicitly shown, for advancing tape 40 at any convenient speed, a reading head 60 mounted in position to read the magnetic sync signals 46, and a marking device 62, shown illustratively as a punch 64 mounted on the bracket 65 and driven by the solenoid 66. Sync signals from head 60 are amplified at 68 and may then be shaped or otherwise processed at 69 to produce current pulses of suitable amplitude and waveform to actuate punch 64. That actuation is sufficiently rapid that it does not prevent essentially continuous movement of the tape. Magnetic sync signals 46 are thus in effect converted into a corresponding series of punched holes 70.

FIG. 4 illustrates the converted tape 40*a*, with holes 70*a* and 70*b* corresponding to the invisible magnetically recorded sync signals 46*a* and 46*b* of FIG. 2. Tape 40*a* may be the same tape as 40, typically still carrying initial sync signals 46 as well as signals 70; or may be a different tape, to which the sound record has been transferred in any suitable manner.

Figure 3A:
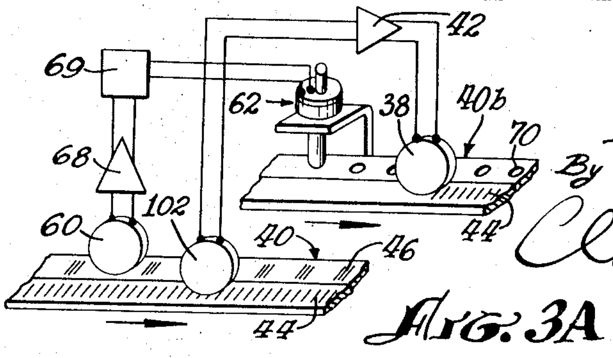
FIG. 3A is a schematic drawing corresponding to FIG. 3 and representing a modification.

That is typically accomplished by the arrangement shown schematically in FIG. 3A. Tape 40 carries the sound record 44 and the magnetic sync signals 46, previously recorded as in FIG. 1. Sound record 44 is read and recorded on the second tape 40*b* in conventional manner, typically utilizing a reading head 102 such as that of FIG. 5 and an amplifier 42 and recording head 38 essentially as in FIG. 1. At the same time, sync signals 46 are read from tape 40 and transferred to tape 40*b* in the form of stationary readable signals 70, typically utilizing the reading head 60, amplifier 68, shaper 69 and marking device 62. Those components operate as in FIG. 3, except that reading head 60 is mounted at tape 40 adjacent sound reading 102 while marker 62 is mounted at tape 40*b* adjacent sound recorder 38. The resulting sync signals 70 then appear on tape 40*b* in definite spatial relation to the transferred sound record. The original tape 40 in FIG. 3A is not affected by that transfer process, but remains permanently available for repeated use as is commonly required of a master tape, for example, in the recording industry.

Holes 70 are illustrative of many different forms of sync signal that may be applied to tape 40 and that can be read by suitable sensing mechanism independently of the tape movement. For example, punch 64 may be replaced by a marking device that applies ink or paint to the tape, or by a point that scribes a continuous line on the tape, the solenoid being repositioned to cause lateral deflection of the line in response to each current pulse. In the latter case, the signals can be read by a stylus which produces a direct current signal corresponding to its lateral position.

FIG. 5 represents illustrative mechanism for reproducing the action and sound recorded by camera 20 and tape 40. A motion picture projector is indicated schematically at 80 with conventional film advancing mechanism 82, driven by the motor 84, and with optical projection means, not explicitly shown. As illustratively shown, motor 84, comprises a permanent magnet rotor 86 mounted on the shaft 87 and cooperating electromagnetically with multiple phase stator windings indicated schematically at 88. Those windings, which are typically shown as three-phase, are adapted to produce a magnetic field that rotates in response to application of three successive phases of driving current. Rotor 86 maintains substantial alignment with that magnetic field as it rotates, driving shaft 87 correspondingly. That shaft drives film mechanism 82 via coupling mechanism 89 which may include gearing 90 to provide the proper drive ratio, typically advancing the motion picture film one frame for each complete cycle of the multiphase driving current.

The mechanism of FIG. 5 includes also a sound reproducer designated by the numeral 100. Reproducer 100 typically comprises a conventional capstan drive, indicated schematically at 101, for advancing tape 40*a* past the magnetic reading head 102, which reads sound record 44 from the tape. The resulting audio signal is amplified in conventional manner at 104 and produced as sound by the loudspeaker 106, or otherwise utilized as desired. Reproducer 100 also includes mechanism 110 for reading sync signals 70 in multiphase. That mechanism comprises separate sensors for the respective phases, spaced along the length of the tape so as to produce sequential responses as the sync signals pass across their respective fields of sensitivity. Multiphase current components for driving motor 84 are derived in any suitable manner from the sensor outputs, typically by separately amplifying the respective outputs.

In the present illustrative system the signal sensing mechanism comprises the lamp 112 and shield means 113 for illuminating a section of tape 40*a* at least as long as the period of repetition of sync signals 70. Optical means may be provided for obtaining any desired distribution of the illumination. As shown, the sheet of opal glass 114 is interposed in the light beam, producing substantially uniform illumination of the tape passing below it. Light transmitted through the punched holes 70 in the tape is sensed by the three light responsive elements 120*a*, 120*b* and 120*c*, which are mutually spaced longitudinally of the film. Elements 120 are typically cadmium sulfide photoresistive cells powered by the common current source 121. Each element is preferably shielded by optical means or by simple baffles, as indicated at 124, to limit its response to a suitable longitudinal portion of the film. As illustrated, if the interval between sync signals 70 is represented as 360°, each sensor 120 is responsive to only 120° of that interval. Accordingly, as a hole 70 passes over the sensors, they are successively energized by light intensity that rises smoothly to a peak value and returns to zero. The responses of adjacent sensors preferably overlay slightly, due in the present structure to the finite size of the signal marks. Hence, for all phase positions of a signal 70, at least one sensor is energized, but not more than two.

The output from each sensor 120 is independently amplified in one of the amplifiers 126. The conventional power supply for these amplifiers is not shown. Each amplifier is connected to one of the three phases of motor windings 88. Amplifiers 126 are of direct current type, so that currents are supplied to windings 88 in response to the respective degrees of energization of sensors 120 independently of movement of tape 40*a*. Accordingly, when the tape is moving at uniform speed, amplifiers 126 produce respective unidirectional periodic current components $I_a$, $I_b$ and $I_c$ that have mutual phase relations as represented schematically in FIG. 6. When the tape is stationary, currents continue to be produced from one or more of amplifiers 126, the relative magnitudes of those currents corresponding uniquely to the particular point at which the effective hole in tape 40*a* happened to stop. Those currents maintain a magnetic field across rotor 86 in a definite direction which corresponds to the tape position, maintaining the rotor positively in a definite orientation. When the tape again starts to move, the magnetic field at rotor 86 immediately begins to rotate, first as a step motor and at increasing speed as a synchronous motor, driving projector mechanism 82 precisely in step with the tape movement. If tape 40*a* is driven in reverse direction for any reason, the magnetic field in motor 84 rotates correspondingly, driving the projector in reverse direction, always in step with the tape movement.

In this simple form of the invention, one series of marks, such as the holes 70, is used to control all three phases of the motor 84. However, this invention may alternatively employ two or more series of periodic marks in suitable mutual phase relation, each controlling a single phase of the motor.

In accordance with a further aspect of the invention, the sound tape shown at 40 in FIGS. 2 and 3 may be considered to represent a typical sound record on which synchronizing signals have been produced by previously available equipment. For example, Pat. 3,124,662, issued on Mar. 10, 1964 to the present applicant, describes a technique for magnetically recording and reproducing synchronizing signals of improved quality, using a plurality of reproducing heads that are effectively spaced along the tape by integral multiples of the signal period. Bitting Patent 2,679,187 describes the magnetic recording of a synchronizing signal generated from the vibration of the camera intermittent movement, which may be considered as a functional equivalent of the cam 26 shown illustratively in FIG. 1 of the present application. Synchronizing signals in step with the camera intermittent movement can also be derived from an alternating power source that drives the camera via a conventional synchronous motor, as described in Kennedy Patent 2,822,722. However, the latter technique has the disadvantage that alternations of the power source are not ordinarily strictly in step with the camera movement during starting and stopping of the camera.

In accordance with the present invention, any periodic signal carried by the sound record and synchronized in some difinite manner with the exposure of successive frames in the camera can be processed as shown schematically in FIG. 3 to transform the sync signals into stationary readable signals that are suitable for use in a reproducer of the type shown schematically in FIG. 5. That is true not only for magnetically recorded sync signals but also for signals initially recorded in any other form, reproducing head 60 of FIG. 3 being then replaced by a suitable sensor or transducer for reading the existing signals.

Such transformation of sync signals applied by a previous technique may require also a change of period of the signals to conform to the particular mechanism that is available for reproduction. For example, the signal generator on the camera may produce more than one pulse per motion picture frame, while it is generally preferred to employ only one mark 70 per frame. Under such conditions, electrical count down circuitry of known type may be provided at 69 in FIG. 3 to convert the input pulses from amplifier 68 to a smaller number of output pulses supplied to solenoid 66 or its equivalent. The number of pulses per frame can also be increased, if desired. For example the pulse frequency can be doubled by including in circuitry 69 a monostable multivibrator that completes one cycle in response to each input pulse and produces two output pulses per cycle at half the input period. Alternatively, punch 64 may be provided with multiple plungers, appropriately spaced with respect to the rate of tape drive to produce a series of uniformly spaced holes.

If a previously produced sound record already carries a synchronizing signal in stationary readable form, it can usually be reproduced in the manner of FIG. 5 without any conversion of the sync signals, or conversion may be limited to change of signal frequency, for example, or change from one type of stationary readable signal to another type that is better adapted for reading in multiphase by the particular reproducing equipment at hand. Under some conditions a change of signal frequency by a non-integral factor may be required. For example, many conventional synchronizing methods use sync signals magnetically recorded at a frequency of either 50 or 60 cycles per second. In converting such tapes the recorded signals may be read, preferably in multiphase, and employed to drive a motor such as 84 of FIG. 5. A signal generator, such as the cam 26 of FIG. 1, is coupled to that motor through a gear train of desired ratio and actuates a punch or other transducer to record the new sync signal in the manner of FIG. 3. It is to be noted that if the camera speed is 24 frames per second, the projector speed will be 24 frames per second. Likewise in the case of many 8 mm. and 16 mm. cameras, if the camera speed is 16 frames per second or 18 frames per second, the projection will be at the same frame speed as the original.

FIG. 7 illustrates a further aspect of the invention, whereby a stationary readable sync signal is prerecorded on the sound tape prior to recording of the sound. During recording of the information, the sound recorder is then driven under conventional speed control. The sync signal on the sound tape is read in multiphase, and the resulting amplified currents are employed to drive the motion picture camera in sync with the recorder. A start mark is applied to the tape in any convenient manner at the start of photography. Camera drive is then controlled by means of the tape recorder, typically via its conventional on-off drive control. Complete and accurate correspondence of the tape and film movements are thereby maintained from start through any desired series of takes, including stops and reversals of direction, if required. FIG. 7 further illustrates a visible sync signal of sine wave form, and apparatus for reading the signal in two-phase rather than three-phase components.

As represented in FIG. 7, the tape recorder is driven by the motor 136 under control of the switch 138, that drive being typically of conventional type designed to give constant speed. The sync signal may be of any suitable stationary readable type, including, for example, the punched holes 70 of FIGS. 3 to 5. FIG. 7 illustrates a periodic sync signal 142 of sine wave form, typically printed on the tape 140 with ink of a type that does not interfere with the magnetic properties of the tape. That signal may extend the entire width of the tape, and may be applied to either face. The signal area is illuminated by the lamp 144 and lens 145, and the signal is detected by two photosensitive devices indicated schematically at **146*a* and 146*b*. Each device includes a sensor and optical means of any suitable type to limit the field of view of the sensor to essentially a line region extending laterally of the tape, as indicated at 147*a* and 147*b*. Those two lines are spaced longitudinally of the tape at positions at which the two sensed sync signals are 90° out of phase. The sensor outputs are amplified by the respective amplifiers 148*a* and 148*b* which have output stages typically of pushpull type and provide driving currents $I_a$ and $I_b$. Those currents are represented graphically in FIG. 8, and will be seen to constitute essentially a conventional two-phase alternating current. The two current components are supplied to the respective windings 152*a* and 152*b* of the two-phase permanent magnet motor 150. The permanent magnet rotor 154 is driven to a position that corresponds to the mutual phase relation of the two input current components. The rotor shaft 155 is coupled to the motion picture camera 160 at a selected speed ratio, typically such that each film frame corresponds to one cycle of sync signal 142**.

During photography, the accompanying sound is picked up by the microphone 162, amplified at 164 and recorded by head 166 on the band 168 of tape 140. That recording band need not be distinct from the area of sync signal 142.

After the motion picture film has been processed in conventional manner, it is typically projected as already described. That is, the sound record 140 is driven in normal manner in a sound reproducer, the sync signal is sensed in multiphase, and the resulting currents are amplified and employed to drive the motion picture projector. FIG. 5 may be considered to represent that process, with the understanding that the signal reading mechanism 110 is to be modified to respond properly to whatever type of sync signal is employed on the sound tape. It is noted that when the tape carries a prerecorded stationary readable sync signal, as represented especially in FIG. 7, the step of signal conversion represented in FIG. 3 is not required. As in the procedure of FIGS. 1 to 6, both camera and projector can be stopped and started at will, and even reversed, without loss of precise sync, and optimum sound quality is maintained since the sound record drive is completely independent of the synchronizing mechanism both during recording and reproduction of the sound.

An important advantage of the present invention is that, in addition to being fully adaptable to normal professional editing procedures, it makes available to the amateur motion picture photographer many techniques of editing the previously required relatively complex and expensive equipment. In connection with 8 mm., Super 8 mm. or 16 mm. cameras, the sound can be recorded conveniently on a conventional tape recorder to which a sync signal recording head has been added. With conventional ¼" tape, for example, the sound may occupy one-half of the tape width, or may occupy one-quarter of the tape width if a conventional 4-track recorder is used. A sync signal for each film frame is generated in the camera and is magnetically recorded on the other half of the tape. The picture film is processed in the usual way; and the sound tape is run through a converter, such as that shown illustratively in FIG. 3, which punches holes at intervals corresponding to the sync signals and in the same area of the tape as those signals. If the tape speed was set during recording at or near the same speed as the picture film, the holes in the punched tape will then approximately match the sprocket holes in the picture film. For example, Super 8 mm. film at 24 frames per second represents a film speed of 20 feet per minute. The conventional tape recorder speed of 3¾" per second corresponds to 18.75 feet per minute, which is satisfactorily close for most purposes. The film and tape can then be hand synchronized, the slight difference in period between the holes and the perforations being compensated by sliding one record strip relative to the other. Or the tape can be run over a drum which carries radial pins and is shaft connected to the sprocket wheel over which the film passes. Corresponding portions of tape and film are thus readily identified for cutting and splicing.

Music and sound effects can be added to the original sound track, for example during transfer of the latter from the original tape to a secondary tape or to sprocketed film. The original tape may control the speed of the picture projector or viewer, generally as shown in FIG. 5. The sound record is read from the tape and combined electronically with any desired supplementary sound, the result being recorded on a freely driven secondary tape along with a sync signal. That signal may be derived, for example, from one component of the current that drives the projector. That sync signal is later converted to a stationary readable type in the manner already described.

To transfer the sound to a sprocketed tape, the latter may be driven under control of the original tape in parallel with the picture projector, either by mechanical connection, or by a separate multiphase, step-synchronous motor connected in parallel to the projector motor. The sound is read from the first tape, electronically supplemented to any desired extent, and then directly recorded on the sprocketed tape. The latter requires no special sync signals, since the sprocket holes correspond directly with the perforations of the picture film.

By comparing FIGS. 1 and 3 it will be seen that if the longitudinal spacing between the signal and sound recording heads 32 and 38 in FIG. 1 equals the spacing between signal reading head 60 and punch 64 in FIG. 3, the punched holes 70 will lie directly adjacent the sound record to which they relate. In practice it is usually more convenient to arrange signals 70 at a definite spacing from the corresponding sound record, typically two or three cycles. A corresponding spacing is then provided between signal reader 110 and reproducing head 102 in FIG. 5. With suitable selection of those several intervals, the first punched hole in tape 40*a* of FIG. 5 will start the projector synchronously with the beginning of the appropriate sound. In editing the film, the mutual spacing of sync signals 70 is so nearly uniform in actual practice that no account need ordinarily be taken of the fact that each hole 70 is actually associated with a slightly spaced portion of the sound record. The only exception is in cutting the tape at the start of each picture sequence. However, when two cut tape sections are joined together, the sync signals at the end of the first section serve to synchronize the sound at the start of the second section, with no detectable departure from uniformity.

The illustrative current waveform generated by sync reader 110 of FIG. 5 and shown in FIG. 6 will approximate a sine wave if the sync hole diameter is approximately ⅓ of a cycle. As the hole diameter becomes smaller with respect to the spacing on the tape the waveform approximates more and more closely a square wave. The currents delivered to motor 84 can be shaped, as by limiting circuits incorporated in amplifiers 126, to produce strict square wave configurations, if desired. A similar output is directly obtainable, for example, by replacing the photosensitive reader 110 by a set of three suitably spaced contact fingers that ride on tape 40*a* and project through the signal holes to contact a conductive plate.

I claim:

1. A dual film sound motion picture system that includes an independently driven sound transducer for magnetically transducing sound with respect to a magnetic tape, and a motion picture machine for intermittently advancing a perforated motion picture film under control of indicia on the tape to maintain the film in synchronism with the tape; said system being further characterized by
- means for sensing the tape indicia independently of tape movement and for deriving a multiphase signal representing the tape position,
- and means responsive to said multiphase signal for driving the motion picture machine in synchronism with tape movement and for arresting drive of the motion picture machine in absence of tape movement.

2. A system as defined in claim 1, and in which said indicia comprise visible marks at longitudinally periodic positions of the tape, and said sensing means comprise a plurality of photosensitive elements responsive to said marks and spaced longitudinally of the tape by nonintegral multiples of the spacing of said marks.

3. A system as defined in claim 1, and in which successive indicia on the tape correspond to respective picture frames of the motion picture film.

4. A system as defined in claim 1, and in which said signal responsive means comprise a permanent magnet multiphase step-synchronous motor coupled to the motion picture machine, and means for independently direct-current amplifying the respective components of said multiphase signal to supply a multiphase driving current to the motor.

5. A system as defined in claim 1, and in which
- said sound transducer is a sound recorder,
- and said motion picture machine is a motion picture camera.

6. A system as defined in claim 1, and in which
- said sound transducer is a sound reproducer,
- and said motion picture machine is a motion picture projector.

7. A system for driving a motion picture film and a corresponding sound record tape in mutual synchronism, the tape carrying repetitive indicia at intervals having a predetermined relation to picture frames of the film, said system comprising in combination
- means for selectively driving the sound record tape along a path and for transducing sound with respect to the driven tape,
- means for reading indicia on a tape in the path in multiphase to produce a plurality of signal components having mutual phase relations that correspond to the longitudinal position of the indicia with respect to the reading means,
- an electric motor responsive to a multiphase input current and having a rotor that is positively driven in angle in accordance with the mutual phase relations of the current components of said input current,
- means for deriving from said signal components respective current components and for supplying the same as multiphase input current to the motor,
- a motion picture machine including means for driving the motion picture film,
- and means drivingly coupling the motion picture machine to the rotor to maintain mutual synchronism of the film and tape.

8. A system as defined in claim 7, and in which
said indicia are stationary readable,
said indicia reading means are capable of reading indicia on a tape independently of tape movement,
and said current deriving means supply continuously to the motor at least one component of said multiphase input current independently of tape movement.

9. A system as defined in claim 7, and in which
said indicia include a plurality of series of indicia corresponding to the respective components of a multiphase signal,
and said indicia reading means comprise a sensor for reading each of the series of indicia to produce a corresponding signal component.

10. A system as defined in claim 7, and in which said current deriving means comprise a plurality of direct coupled amplifiers, means for supplying said signal components as input signals to the respective amplifiers, and means supplying the amplifier outputs as respective components of a multiphase input current to the motor.

11. Mechanism for modifying a sound record recorded on a magnetic record tape and including a series of magnetically recorded synchronizing signals corresponding to respective sequential intervals of the recorded sound, said mechanism comprising in combination
a magnetic signal sensor,
means for moving magnetic tape longitudinally past the sensor to detect synchronizing signals magnetically recorded thereon,
a marker actuable to apply stationary readable marks to moving magnetic tape,
and control means responsive to signal detection by the sensor for actuating the marker to apply stationary readable marks to magnetic tape in definite spatial relation to said respective sound intervals recorded thereon.

12. Mechanism as defined in claim 11, and in which said marker is mounted in definite spatial relation to the signal sensor for applying stationary readable marks to tape passing the sensor.

13. Mechanism as defined in claim 11, and including
a sound sensor mounted adjacent the signal sensor for reading the sound record on a tape passing the signal sensor,
and a sound recorder for recording on a second tape sound read by the sound sensor,
said marker being mounted adjacent the sound recorder for applying stationary readable marks to the second tape in definite spatial relation to said respective sound intervals recorded thereon.

14. Mechanism as defined in claim 11, and in which said control means include circuit means producing an electrical pulse in response to each signal detected by the sensor, and means for actuating the marker in response to each pulse.

15. Mechanism as defined in claim 11, and in which said control means include circuit means producing an electrical pulse in response to each signal detected by the sensor, counting means responsive to a predetermined number of said pulses, and means for actuating the marker under control of the counting means.

16. Mechanism as defined in claim 11 and in which said marker comprises a punch actuable to punch a hole in magnetic tape at a point spaced laterally from said sound record.

17. The method of reproducing action and accompanying sound, comprising in combination
making a motion picture record of the action,
recording the accompanying sound magnetically on a magnetic tape, while recording magnetically on the tape synchronizing signals relating to respective frames of the motion picture film,
transforming the magnetically recorded synchronizing signals to stationary readable form,
reproducing the recorded sound while sensing the transformed synchronizing signals in multiphase to produce a multiphase current,
and projecting the motion picture record under control of the multiphase current and in synchronism with the reproduced sound.

18. A system as defined in claim 1, and in which said indicia include a plurality of series of indicia corresponding to the respective components of a multiphase signal, and said indicia sensing means comprise a sensor for sensing each of the series of indicia to produce a corresponding signal component.

References Cited

UNITED STATES PATENTS

| | | | |
|---|---|---|---|
| 1,027,658 | 5/1912 | Kellum | 352—16 |
| 1,949,909 | 3/1934 | Heckler | 352—15 |
| 2,699,089 | 1/1955 | Jakobs et al. | 352—15 |
| 2,961,919 | 11/1960 | Angelo | 352—17 |
| 3,290,167 | 12/1966 | Wood et al. | 118—9 |
| 3,306,698 | 2/1967 | Mees et al. | 352—92 |
| 3,454,451 | 7/1969 | Buckholz | 83—371 |

S. CLEMENT SWISHER, Primary Examiner

U.S. Cl. X.R.

83—371; 234—69; 352—92. 130